United States Patent [19]
Smith

[11] 3,867,679
[45] Feb. 18, 1975

[54] MOTOR FIELD STRENGTH VARIABLE BRUSH PRESSURE APPARATUS AND METHOD

[75] Inventor: Stephen Hagar Smith, San Pedro, Calif.

[73] Assignee: McCulloch Corporation, Los Angeles, Calif.

[22] Filed: July 11, 1973

[21] Appl. No.: 378,047

[52] U.S. Cl. ............... 318/542, 318/361, 310/240
[51] Int. Cl. ............................................ H01r 39/42
[58] Field of Search ........... 318/541, 542, 361, 439; 310/240

[56] References Cited
UNITED STATES PATENTS

| | | |
|---|---|---|
| 1,974,157 | 9/1934 | Ilo ............................... 310/240 X |
| 3,098,184 | 7/1963 | Deriaz ........................... 310/240 X |
| 3,171,997 | 3/1965 | Hammer ......................... 310/240 X |
| 3,278,777 | 10/1966 | Grooms ......................... 318/542 X |
| 3,532,914 | 10/1970 | Chang et al. .................... 310/240 |
| 3,591,820 | 7/1971 | Jones ............................ 310/240 |

*Primary Examiner*—B. Dobeck
*Attorney, Agent, or Firm*—Burns, Doane, Swecker & Mathis

[57] ABSTRACT

A method and apparatus is disclosed for continuously varying the pressure of brushes against a commutator of a direct current or universal electric motor in response to variations in motor load.

11 Claims, 4 Drawing Figures

PATENTED FEB 18 1975  3,867,679

MOTOR FIELD STRENGTH VARIABLE BRUSH PRESSURE APPARATUS AND METHOD

BACKGROUND OF THE INVENTION

The present invention relates to a method and apparatus for varying the pressure of the brushes on the commutator in an electric motor, and to a method and apparatus for varying brush pressure responsively to motor load conditions.

The use of electric motors is becoming increasingly prevalent for countless applicances and tools in which the motor is operated over a wide range of speeds. With these motors operating at full speed and the commutator thereof thus rotating at a relatively high angular velocity, there is a tendency for a boundary layer of air to flow over the surface of the commutator and under the motor brushes to thus produce a gap between the commutator and the contact surfaces of the brushes. This gap may produce arcing which could result in damage to both the brushes and the commutator surface and which may otherwise be detrimental to motor operation.

To combat this tendency, some mechanism is generally employed which ensures a relatively high brush pressure. Pressure sufficient to minimize arcing during full speed operation of the motor is customarily achieved through the utilization of a spring to bias the brush against the surface of the commutator.

While the arcing problem is thus reduced at high motor speeds, the force with which the brush is biased against the commutator produces a significant amount of friction tending to retard the rotation of the commutator. A substantially constant loss of power occurs as a result of this friction. This power loss may be tolerable at high load conditions where the friction losses are small relative to the power required by the load. However, at very light loads of the motor, these friction losses may equal the power required by the load and thus drastically reduce the efficiency of the motor.

For example, brush pressure is customarily about 4 to 8 pounds per square inch to ensure good ohmic contact between the brushes and the commutator for arc minimization. This brush pressure may produce a brush friction loss in a one horsepower motor of about 0.1 horsepower. At rated load, this friction loss reduces the useful power output of 0.9 horsepower with the corresponding efficiency of 90 per cent. Where, however, the motor is operated under light load conditions such as where only 0.1 horsepower is required by the load, the 0.1 horsepower loss due to brush friction represents one-half the total power produced and the efficiency of the motor is accordingly reduced to 50 per cent.

It is therefore a general object of the present invention to obviate the deficiencies of the prior art and to provide a novel variable brush pressure apparatus and method.

Another object of the present invention is to provide a novel apparatus and method for improving the efficiency of an electric motor operating under light load conditions.

It is another object of the present invention to provide a novel apparatus and method for reducing brush pressure under light motor load conditions.

It is still another object of the present invention to provide a novel apparatus and method for continuously varying the bursh pressure of an electric motor as a function of load.

It is yet another object of the present invention to provide a novel apparatus and method for minimizing the losses due to friction as a result of high brush pressure at low motor loads.

It is yet still another object of the present invention to provide a novel apparatus and method for enhancing the useful life of the brushes of an electric motor.

BRIEF DESCRIPTION OF THE DRAWINGS

Other objects and advantages of the present invention will become apparent with reference to the following detailed description of a preferred embodiment thereof in connection with the accompanying drawings wherein like reference numerals have been applied to like elements in which.

DETAILED DESCRIPTION OF A PREFERRED EMBODIMENT OF THE INVENTION

Figure 1:
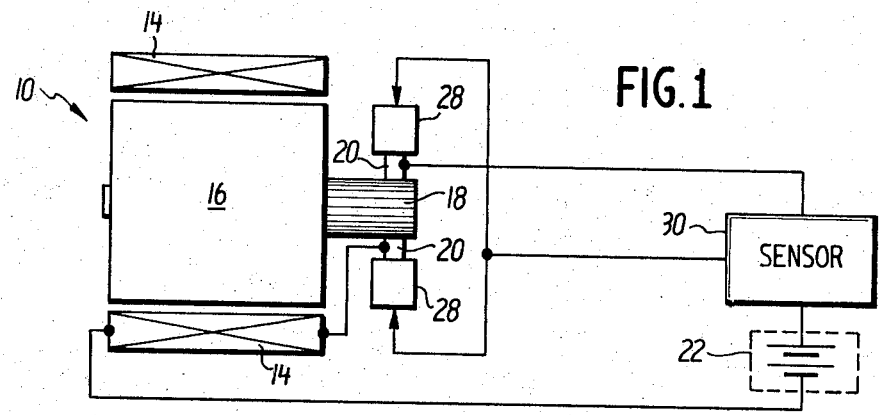
FIG. 1 is a schematic diagram of an embodiment of the present invention.

In FIG. 1 there is illustrated a block diagram of an embodiment of the present invention which includes direct current electric motor 10 having field windings 14 and armature windings 16. In the embodiment illustrated, the armature windings 16 are electrically connected in a conventional manner by a commutator 18 and a pair of brushes 20 in series with the field windings 14 and a power supply means 22. It is, however, to be understood that the present invention is applicable to shunt as well as series motors.

With continued reference to FIG. 1, a brush pressure control means 28 is operatively connected to each of the brushes 20 to control the pressure of the brushes 20 on the commutator 18. The brush pressure control means 28 are in turn responsive to a sensor 30 of the load on the motor. The sensor 30 may be, for example, a coil connected in the motor supply circuit as explained hereinafter in greater detail.

By the means illustrated, the pressure of the brushes 20 on the commutator 18 of the electric motor 10 may be varied by the brush pressure control means 28 in response to variations in load on the electric motor. Typically, as the load on the motor decreases, the sensor 30 will sense this change in load and will provide an appropriate signal to the brush pressure control means 28 to reduce the pressure of the brushes 20 on the commutator 18 to thereby reduce the brush friction losses of the motor.

Figure 2:
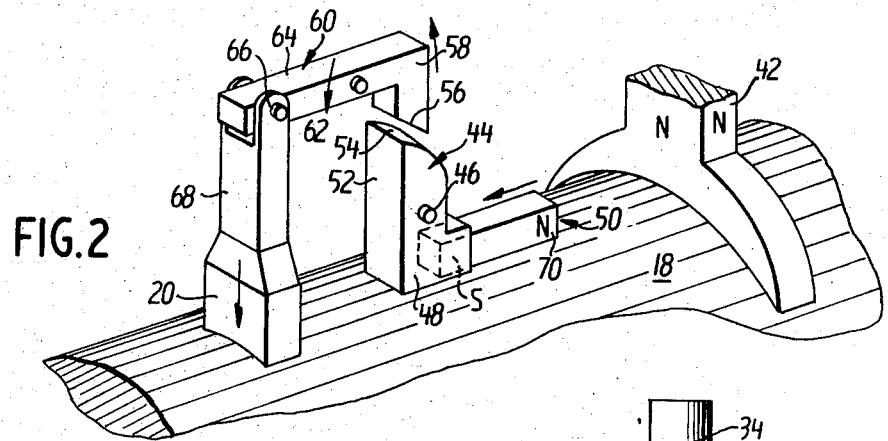
FIG. 2 is an axonometric view of one means for a varying brush pressure which may be utilized in the practice of the invention shown in FIG. 1.

A variety of apparatus exists which would be cooperable as a brush pressure control means 28 and as a load responsive energizing means. For example, and with reference to FIG. 2, such apparatus may include a cam 44 displaced slightly axially from a pole shoe 42 of the motor and pivotable about a cam shaft 46 extending transverse to the commutator 18. The cam 44 may be provided at the lower end 48 thereof with a small permanent magnet 50 and provided at the other end 52 thereof with a curved cam surface 54.

The surface 54 of the cam is designed to cooperate with a reaction surface 56 on the end 58 of a pivot arm 60 mounted for pivotal motion about a shaft 62 generally parallel to the longitudinal axis of the cam shaft 46. The other end 64 of the pivot arm 60 may be pivotally connected by means of a pin 66 to an electrically conductive support 68 for a brush 20.

As is well known in the electric motor art in the operation of a direct current motor, current flows in windings (not shown in FIG. 2) about the pole shoe 42 to thereby create a magnetic pole. By the appropriate oritentation of the polarity of the permanent magnet 50 so that the proximate end 70 thereof is of the same polarity as the pole shoe 42, the permanent magnet 50 will be repelled from the pole shoe 42 with a force related to the strength of the two magnets. The strength of the permanent magnet 50 is fixed, but the strength of the pole shoe magnet 42 is a function of the current through the windings thereabout, and, thus, the load on the motor. The force of repulsion is therefore a function of motor load.

The repulsion of the permanent magnet from the pole shoe 42 will pivot the cam 44 in a clockwise direction about the shaft 46. The clockwise pivoting of the cam 44 will, in turn, force the counterclockwise pivoting of the rocker arm 60 about the shaft 62 through the cam surface 54 with the reaction surface 56. The counterclockwise pivoting of the rocker arm 60 will, in turn, exert a downward pressure on the brush 26. The pressure on the brush 26 thus becomes variable as a function of the strength of the pole shoe magnet 42 and thereby a function of the motor load.

Figure 3:
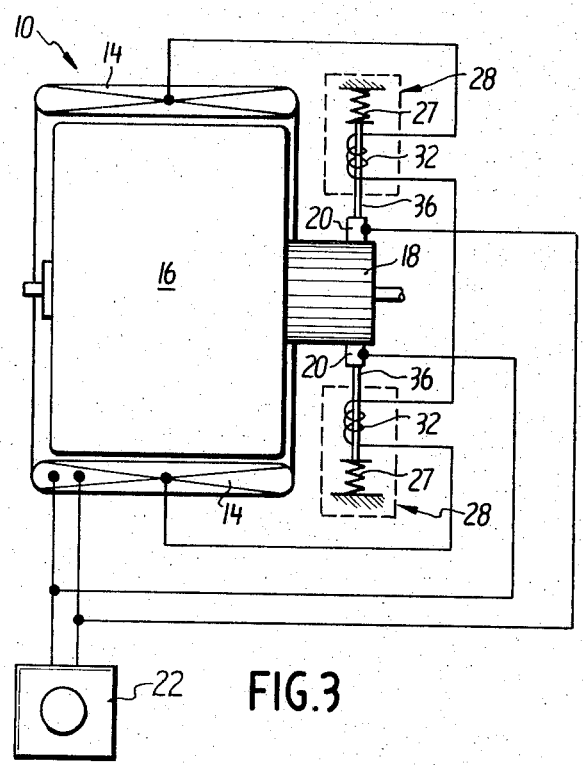
FIG. 3 is a partial schematic and partial elevational view in longitudinal section of another embodiment of the present invention.

FIG. 3 is a partial schematic and partial elevational view in longitudinal section of another embodiment of the present invention. With reference to FIG. 3 wherein like elements in FIG. 1 have been accorded like numerical designations, a direct current electric motor 10 is powered by a conventional source 22 of direct current. The source 22 here functions both as field winding power supply and as an armature power supply with the field windings 14 and the armature windings 16 connected in parallel by way of a commutator 18, and the brushes 20 maintained in pressural contact therewith by the brush control means 28.

The brush pressure control means 28 as illustrated in FIG. 3 may also serve the motor load sensing function of the sensor 30 of FIG. 1 and comprise a spring 27 biased pressure post 36. The posts 36 may be made of paramagnetic material to serve as the armatures of a pair of solenoid coils 32 electrically connected in parallel with the filed windings 14.

The current in the field windings 14 will vary proportionately with the load on the motor. There will be a corresponding variation of current in the solenoid coils 32 in response to changes in motor load to vary the amount of brush pressure added to that supplied by the springs 27 as a function of motor load. For lights motor loads, the current in the solenoid coils will exert less force through posts 36 on the brush 20 and thus reduce brush pressure below that of brush pressure at rated load. By thus reducing brush pressure, the efficiency of the motor will be greatly improved.

As noted above, the electromagnetic force produced by the passage of current through the windings of the solenoid 32 is operable to effect change in brush pressure. It is apparent that, depending upon the wiring or type of direct current motor being utilized, the current in the solenoid may be made responsive to current in either the field windings, the armature windings, or both, in such a manner to vary the electromagnetic force in the solenoid. The solenoid may be used to either increase or decrease brush pressure in relation to the force of the spring 27. In some arrangements, a spring 27 may not be necessary as the electromagnetic forces produced in the solenoid upon application of current from source 22 may be alone sufficient for satisfactory motor operation.

Figure 4:
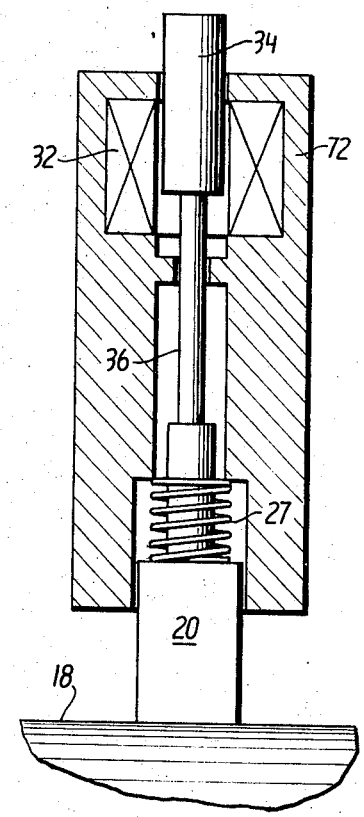
FIG. 4 is an elevational view in longitudinal section of a means for varying brush pressure in the embodiment shown in FIG. 3.

FIG. 4 is an elevational view in longitudinal section of a means 28 for varying brush pressure in the embodiment shown in FIG. 3. The brush 20 is constrained to travel in a brush guide or housing 72 which contains the solenoid 32 and a solenoid core 34 attached to the brush 20 by means of pressure post 36.

When the solenoid 32 is actuated, the solenoid core 34 is pulled radially inwardly of the motor in a direction towards the brush 20. The electromagnetic force tending to pull the solenoid core inwardly is transferred to the brush 20 by means of the pressure post 36. Thus, it can be seen that the force acting on the brush 20 will vary with the current in the solenoid 32.

The spring 27 is operable to provide a force to bias the brush against the commutator 18 with sufficient force for relatively light loads. However, as the loading of the motor increases, the solenoid may be conventionally wired to produce a corresponding increase in electromagnetic force acting on the core 34 thereby augmenting the brush pressure. Mechanical stops may be provided to limit the pressure of the brushes 20 on the commutator 18 to a predetermined maximum.

It will, of course, be appreciated that the spring 28 may be utilized to produce maximum pressure for full motor loading and that the solenoid may be operable to reduce this brush pressure for relatively light loads. Moreover, as previously noted the present invention may be practiced without presence of any spring whatsoever to bias the brush against the commutator.

SUMMARY OF ADVANTAGES AND SCOPE OF THE INVENTION

It will be appreciated that in constructing a motor field strength variable brush pressure apparatus and practicing the method in accordance with the present invention, certain significant advantages are provided.

In particular, the reduced friction on the commutator during light motor loads may materially increase the efficiency of the motor under these load conditions. This increased efficiency may result in imporved operation of the motor and in reductions in heat and ohmic losses with significant economic savings in reduced power consumption as a result of the increased efficiency during light load operation.

For example, the typical brush friction losses of a one horsepower motor are about 0.1 horsepower or 10 per cent. When, however, the motor is generated at light loads such as 0.2 horsepower, the typical 0.1 horsepower brush friction loss is 50 per cent of the total power. Reduction of the friction losses at light loads may then represent a substantial increase in motor efficiency.

In addition, wear on the brushes as a result of high friction may be substantially eliminated for low speed operation, thus greatly enhancing the life of the brushes.

Thus, it is apparent that there has been provided, in accordance with the invention, a motor field strength variable brush pressure apparatus and method. Although the present invention has been described in conjunction with specific embodiments thereof, it is evident that many alternatives, modifications, and variations will be apparent to those skilled in the art in light of the foregoing disclosure of the invention. Accordingly, it is intended that all such alternatives, modifications, and variations which fall within the spirit and scope of the invention as defined in the appended claims be embraced thereby.

What is claimed is:

1. In a direct current or universal electric motor having an armature and commutator brushes, a method of increasing motor efficiency while operating the motor at loads less than rated loads by (a) detecting motor load, and (b) modifying the pressure of the brushes on the communtator of the motor as a function of the detected motor load.

2. The method of claim 1 wherein the pressure of the brushes is modified by varying the current in a solenoid coupled to the brushes as a function of the current in the field winding of the motor.

3. The method of claim 1 wherein the pressure of the brushes is modified by varying the current in a solenoid coupled to the brushes as a function of the current in the armature winding of the motor.

4. The method of claim 1 wherein the pressure of the brushes is modified by the steps of:
varying the magnetic strength of a pole shoe as a function of motor load; and
camming the brushes against the commutator of the motor by magnetic repulsion of a permanent magnet by the pole shoe.

5. In an electric motor of a direct current or universal type having a housing, field windings, armature windings, a commutator for the armature windings, and electrically conductive brushes in pressural engagement with the commutator, the improvement comprising means carried by the housing of the motor and responsive to the motor load for dynamically varying the pressure with which the motor brushes engage the commutator of the motor to thereby modify the frictional drag of the motor brushes on the commutator as a function of the load of the motor.

6. The motor of claim 5 wherein said brushed pressure varying means is responsive to the amplitude of the current in the field windings of the motor.

7. The motor of claim 5 wherein said brushes pressure varying means is responsive to the amplitude of current in the armature windings of the motor.

8. The motor of claim 7 wherein the brush pressure varying means is also responsive to the amplitude of the current in the field windings of the motor.

9. The motor of claim 5 wherein said brush pressure varying means includes cam surfaces and permanent magnet means positioned to react to the magnetic strength of the motor poles for camming the brushes against the commutator.

10. A method of enhancing the life of motor brushes while operating the motor comprising the steps off (a) detecting motor load, and (b) reducing below the brush pressure at the rated load of the motor the pressure with which the brushes engage the commutator of the motor for motor loads below the rated load of the motor.

11. Apparatus for enhancing the life of the brushes of an electric motor while operating the motor comprising:
means for applying a predetermined contact pressure to the motor brushes;
means for sensing motor load; and,
means responsive to said motor load sensing means for varying the contact pressure of the motor brushes at loads below rated loads to thereby enhance brush life.

* * * * *